United States Patent
Bursy et al.

(10) Patent No.: US 12,183,504 B2
(45) Date of Patent: Dec. 31, 2024

(54) METHOD AND DEVICE FOR CONNECTING SHEET METAL PARTS TO FORM LAMINATION STACKS

(71) Applicant: voestalpine Automotive Components Dettingen GmbH & Co. KG, Dettingen an der Erms (DE)

(72) Inventors: Heinrich Bursy, Erkenbrechtsweiler (DE); Jochen Lanksweirt, Heidenheim (DE); Axel Rainer Nann, Stuttgart (DE)

(73) Assignee: voestalpine Automotive Components Dettingen GmbH & Co. KG, Dettingen an der Erms (DE)

( * ) Notice: Subject to any disclaimer, the term of this patent is extended or adjusted under 35 U.S.C. 154(b) by 842 days.

(21) Appl. No.: 17/275,113

(22) PCT Filed: Sep. 10, 2019

(86) PCT No.: PCT/EP2019/074141
§ 371 (c)(1),
(2) Date: Mar. 10, 2021

(87) PCT Pub. No.: WO2020/053230
PCT Pub. Date: Mar. 19, 2020

(65) Prior Publication Data
US 2022/0051838 A1    Feb. 17, 2022

(30) Foreign Application Priority Data

Sep. 10, 2018    (DE) .................... 10 2018 122 047.2

(51) Int. Cl.
*H01F 3/02*        (2006.01)
*B32B 15/01*       (2006.01)
(Continued)

(52) U.S. Cl.
CPC .............. *H01F 3/02* (2013.01); *C22C 38/02* (2013.01); *H01F 41/0206* (2013.01);
(Continued)

(58) Field of Classification Search
CPC ....... H01F 3/02; H01F 41/0206; C22C 38/02; H02K 15/02; B32B 15/011; B32B 37/18
See application file for complete search history.

(56) References Cited

U.S. PATENT DOCUMENTS

| | | |
|---|---|---|
| 4,103,195 A | 7/1978 | Torossian et al. |
| 4,330,112 A | 5/1982 | Toshimitsu et al. |

(Continued)

FOREIGN PATENT DOCUMENTS

| | | | | |
|---|---|---|---|---|
| CN | 107851818 A | * | 3/2018 | .......... H01M 8/0273 |
| CN | 114785060 A | * | 7/2022 | ............. H02K 15/02 |

(Continued)

*Primary Examiner* — Jeffrey T Carley

(57) ABSTRACT

A method and a device for connecting sheet metal parts to form lamination stacks, wherein a sheet metal strip whose top and/or bottom surface has a hardenable polymer adhesive layer is transported continuously through an application device in which a fluid that contains an activator is applied to the adhesive layer, the applied fluid is dried, the sheet metal strip that is coated with the dried activator is continuously fed to a strip accumulator, the sheet metal strip from the strip accumulator is fed to a cyclically operating cutting device in which sheet metal parts are cut from the sheet metal strip and stacked on one another, and the cut and stacked sheet metal parts are connected to one another to form lamination stacks by means of the adhesive layers that are coated with the activator. The invention also relates to the lamination stacks produced according to the method.

18 Claims, 2 Drawing Sheets

(51) Int. Cl.
  *C22C 38/02* (2006.01)
  *H01F 41/02* (2006.01)
  *H02K 15/02* (2006.01)
  *B32B 37/18* (2006.01)

(52) U.S. Cl.
  CPC ............ *H02K 15/02* (2013.01); *B32B 15/011* (2013.01); *B32B 37/18* (2013.01)

(56) References Cited

U.S. PATENT DOCUMENTS

| | | | |
|---|---|---|---|
| 10,543,674 B2 * | 1/2020 | Bormann | ............... B31B 70/146 |
| 2004/0247927 A1 * | 12/2004 | Kurz | ....................... B32B 15/01 |
| | | | 428/608 |
| 2012/0156441 A1 | 6/2012 | Gerster et al. | |
| 2013/0154430 A1 * | 6/2013 | Dragon | ............... H02K 15/0012 |
| | | | 310/211 |
| 2018/0082773 A1 | 3/2018 | Kern et al. | |

FOREIGN PATENT DOCUMENTS

| | | | | |
|---|---|---|---|---|
| DE | 102012001744 | A1 | 8/2013 | |
| DE | 102015012172 | A1 | 3/2017 | |
| DE | 102017001802 | A1 * | 8/2017 | |
| EP | 0008811 | A1 | 3/1980 | |
| EP | 2450189 | A1 * | 5/2012 | ........... B32B 15/043 |
| EP | 2883692 | A1 | 6/2015 | |
| EP | 3089335 | A1 | 11/2016 | |
| JP | S5330706 | A | 3/1978 | |
| JP | S573560 | A | 1/1982 | |
| JP | S6016155 | A | 1/1985 | |
| JP | 2005348456 | A * | 12/2005 | |
| JP | 2011109123 | A | 6/2011 | |
| JP | 2016506313 | A | 3/2016 | |
| JP | 2018518591 | A | 7/2018 | |
| KR | 20110059846 | A | 6/2011 | |
| KR | 20140001895 | A | 1/2014 | |
| KR | 20180094844 | A | 8/2018 | |
| WO | 2008132041 | A1 | 11/2008 | |
| WO | 2012059588 | A1 | 5/2012 | |
| WO | 2014089593 | A1 | 6/2014 | |
| WO | 2016151129 | A1 | 9/2016 | |
| WO | WO-2017060091 | A1 * | 4/2017 | ............. B32B 15/08 |
| WO | WO-2018127983 | A1 * | 7/2018 | ............. B05C 1/025 |

* cited by examiner

METHOD AND DEVICE FOR CONNECTING SHEET METAL PARTS TO FORM LAMINATION STACKS

FIELD OF THE INVENTION

The present invention relates to a method and device for connecting sheet metal parts to form lamination stacks and to correspondingly produced lamination stacks.

DESCRIPTION OF THE PRIOR ART

Lamination stacks composed of interconnected sheet metal parts, in particular sheet metal laminations, are used for example in lieu of conventional solid iron cores as magnetic cores of rotors and/or stators of electric machines such as electric motors. The lamination stacks of such magnetic cores are made of many very thin electrical sheets. The electrical sheets in this case are composed of special alloys that have outstanding properties for conducting and amplifying magnetic fields. The individual sheet metal laminations are insulated from one another in the lamination stack. These magnetic cores composed of lamination stacks are some of the most important components of an electric motor, which influence its efficiency in the conversion of electrical energy into kinetic energy. The composition and freedom from stress of the sheet metal parts, the value of their electrical resistance, and the integrity of the insulation are significant influence factors in this regard. These influence factors are essentially determined by the method of connecting the sheet metal parts to one another, in particular whether they are connected to each other over their entire area or only at certain points, and by the machining quality, for example of the stamping burr.

The joining of sheet metal laminations to form a stack is referred to as "stacking" in electrical machine engineering. A stack is an organized batch of many sheets that are initially able to move relative to one another, which are connected to one another. The connection of the sheet metal parts to form the stack is achieved, for example, by means of screws or by means of clamps that are applied to the stack from the outside. Connections of this kind permit the connection to be released, but such connection means generally have a negative influence on the performance of the electrical machine, for example due to an electrical short-circuiting in the region of the connecting means or a disrupted magnetic field.

Another known connecting method is welding. In this case, the sheet metal parts are thermally and adhesively bonded. Here, the stamped and stacked laminations are clamped in a device and are joined at the outer radius by means of a plurality of weld seams oriented orthogonal to the plane of the laminations. But the welding damages the laminations and their insulation layer and can result in increased eddy-current losses or can influence the magnetic field. Although the weld seam results in barely any limitation to the freedom of design, a stack that is produced in this way can no longer be nondestructively disassembled.

Another known connecting method is so-called stamping and stacking. In stamping and stacking, the electrical sheet is stamped out of the raw material in one machine stroke, then placed onto the stack, and connected to the stack. In the stamping and/or placement and in the connecting procedure, mechanical connections are produced in the electrical sheet, which cooperate with the connections of the adjacent electrical sheets. These connections are raised areas, also referred to as studs or nubs, which are embossed into the electrical sheet. Since the insulation coating can be damaged in the region of the deformation, the possibility of short-circuits cannot be ruled out. Furthermore, the connection limits design freedom and because of the local connection means, exerts an influence on the magnetic field.

It is also known to use adhesives and connecting means. This method, which is known as adhesive stacking, usually uses thermosetting hot-melt adhesive varnishes with which the electrical sheet is coated. . As a rule, the raw material, a virtually endless sheet metal strip, is coated with a hot-melt adhesive varnish. After the individual laminations are cut from the sheet metal strip that is coated with hot-melt adhesive, the laminations are oriented relative to one another, are placed onto one another, and thus form a stack. This stack of as yet unconnected sheet metal parts is then heated for a defined period of time, usually 30 to 150 minutes, to a reaction temperature of the hot-melt adhesive. The reaction temperature is generally 150 to 250 degrees Celsius. During the heat exposure, the stack is acted on by means of a clamping device with a pressure of 2 to 6 Newton per square millimeter. This is followed by a cooling phase that lasts for up to 60 minutes. The use of the hot-melt adhesive does achieve a durable connection of the individual laminations over their entire area without damaging the metal structure or the insulation layer, but the clamping and cooling process is very time-consuming and as a result, can only be integrated into a continuous mass production with difficulty.

This disadvantage is overcome by a quasi-continuous method for producing lamination stacks, which is described for example in the international patent application WO 2014/089593 A1, in which it is known that the individual sheet metal parts or sheet metal laminations are cut from a sheet metal strip that is coated at least in some regions with a hardenable polymer adhesive layer, are piled to form stacks, and are adhesively bonded to one another with the application of pressure. With this method, a strip of electrical sheet that is pre-coated with a thermosetting hot-melt adhesive varnish is unwound from a coil and supplied to a stamping device and sheet metal laminations are stamped out from it and are piled with their adhesive-coated sides facing one another to form a sheet metal lamination stack. The pressure of the upper tool of the stamping device produces an adhesive bond of the adhesive-coated surfaces facing one another.

In order to reduce the amount of time and energy required to produce the lamination stacks, particularly with regard to the hardening of the hot-melt adhesive, the above-mentioned international patent application WO 2014/089593 A1 proposes for the stamping of the sheet metal parts or laminations to be preceded by an application of a mixture of water and a thermoplastic and/or cross-linkable bonding agent such as polyvinyl alcohol. According to WO 2014/089593 A1, the mixture can also contain a water-soluble reaction accelerator such as 2-methylimidazole, in order to improve the chemical reaction between the hot-melt adhesive and the bonding agent. Since the application of the bonding agent mixture in the method of WO 2014/089593 A1 is carried out by means of a sprayer device provided immediately before the stamping tool, between the coil device and the stamping tool, an additional drying device is provided, which dries the applied mixture in order to prevent a contamination of the strip transporting device or stamping tool by the watery bonding agent mixture. In this case, an activating device, which supplies steam to the hot-melt adhesive varnish/bonding agent coating, and a heating device for the thermal activation, are then provided in the stamping device itself. By contrast with conventional methods of adhesive stacking lamination stacks in which sheet metal laminations are stamped in a stamping tool, are then often manually piled into stacks, pressed, and hardened in a separate furnace, the method described in WO 2014/089593 A1 enables a quasi-continuous production of electrical sheet stacks in which an electrical steel strip is continuously unwound from a coil and fed to the stamping device and the hardened electrical sheet stacks are ejected from the stamping tool. In spite of this, the method is cyclical insofar as the strip of electrical sheet is stopped during the operation cycle of the stamping device and is then transported further. Based on the cyclical strip transport, however, it is difficult to apply the bonding agent mixture with the required uniformity.

SUMMARY OF THE INVENTION

The present invention is thus based on the technical problem of improving the method described in WO 2014/089593 A1 such that the quality of an auxiliary coating that is applied before the stamping procedure is improved, particularly with regard to the layer thickness and uniformity of the coating.

The invention thus relates to a method for connecting sheet metal parts to form lamination stacks in which a sheet metal strip, whose top and/or bottom has a hardenable polymer adhesive layer, is continuously transported through an application device in which a fluid that contains an activator is applied to the adhesive layer, the applied fluid is then dried, and the sheet metal strip that is coated with the dried activator is then continuously fed to a strip accumulator. From the strip accumulator, the sheet metal strip is fed to a cyclically operating cutting device in which sheet metal parts are cut from the sheet metal strip and stacked on top of one another. Finally, the cut and stacked sheet metal parts are connected to one another to form lamination stacks by means of the adhesive layers coated with the activator that are situated between the individual sheet metal parts.

Thus between the application of a fluid, which contains an activator for the polymer adhesive layer, and the cutting device, in which sheet metal parts are cut from the sheet metal strip, the invention proposes for a strip accumulator to be provided so that the transport of the sheet metal strip upstream of the strip accumulator, particularly during the application of the fluid containing the activator, can occur continuously, whereas downstream of the strip accumulator, a cyclical transport of the sheet metal strip during the operating cycle of the cutting device is enabled. Because of the continuous transport of the sheet metal strip through the application device, it is possible to optimize the quality of the fluid layer containing the activator since a uniformly thick and homogeneous coating is simpler to achieve in a continuous operation than it is in a cyclical operation. At the same time, the cutting of the sheet metal parts can be carried out with high precision since in the region of the cutting device, a cyclical transport of the sheet metal strip during the operating cycle of the cutting device itself is enabled.

The sheet metal strip used in the method according to the invention is preferably an electrical sheet, typically composed of an iron-silicon alloy, which can be produced as non-grain-oriented sheets or grain-oriented sheets. The non-grain-oriented electrical sheets, thanks to their isotropic magnetic properties, are chiefly used in rotating machines such as electric motors.

The hardenable polymer adhesive layers are typically layers composed of thermosetting hot-melt adhesive varnishes of the kind described in European patent application EP 0 008 811 A1. Such substances are also known by the term "backlack." Certain backlacks exhibit thermoplastic behavior, i.e. they soften when heated, which enables an adhesion in the heated state, and harden again on cooling without any chemical change. Thermoplastic synthetic resins of this kind are based, for example, on polyvinyl butyral, polyamides, or polyesters, but have the disadvantage that the adhesive effect can weaken again as the temperature increases during operation. Other thermosettable hot-melt adhesives, which are also referred to as reactive hot-melt adhesives, can be hardened through chemical cross-linking by heating them beyond the plastic state. The hardening is irreversible so that the durability of lamination stacks that are produced with hot-melt adhesives of this kind persists even with heating during operation. The reactive hot-melt adhesives that are preferred in the present method include epoxy resin systems. Such epoxy resin systems usually consist of a resin component and a hardener component, the term "epoxy resin" being used both for the usually liquid resin component and for the solid, cross-linked reaction product of the resin and hardener.

In the method according to the invention, preferably sheet metal strips are used which are coated with a two-stage hardening epoxy resin system, particularly preferably a bisphenol-based epoxy resin system with a suitable hardener, for example a bisphenol A epichlorohydrin resin system with dicyanamide as a hardener. With the use of a two-stage hardening epoxy resin system, during the production of the coated sheet metal strip, the backlack layer is only partially cross-linked so that it is in a state in which at room temperature, it is stable, flexible, and dry, but still reactive. This state of the resin system is referred to as the B-stage. Preferably, therefore, in the method according to the invention, sheet metal strips in which the hardenable polymer adhesive layer (i.e. the backlack layer) is in this B-stage are used as a starting material. Typically, the partially cross-linked backlack layer has a thickness of a few micrometers. When heat is supplied, the backlack layer that is in the B-stage can react further and be transformed into the fully cross-linked C-stage. In the method according to the invention, this happens in the final step of connecting the stacked sheet metal parts to form the lamination stack.

The sheet metal strip can be coated with backlack on its top, on its bottom, or on both sides. In this context, the terms top and bottom refer to the feeding of the horizontally traveling strip into the cutting device. If a backlack coating is provided on the top and bottom, then the thickness and the degree of cross-linking of the layers can be different. In the case of a cutting device that operates with stamping tools that are positioned above the strip, the layer on top of the strip can be embodied as thinner and more highly cross-linked than the one on the bottom in order to minimize a contamination of the stamping tools. A typical layer thickness of the backlack on the more highly pre-cross-linked top is then in the range from 1 to 5 μm and the layer thickness on the less highly pre-cross-linked bottom is in the range from 2 to 10 μm.

The backlack layer used in the method according to the invention advantageously contains fillers for increasing the storage stability of electrical steel strips that are coated with hardenable backlack and for increasing the durability of the backlack layer that is hardened after the lamination stack production. Backlacks with suitable fillers are described, for example, in the international patent application WO 2016/151129 A1. According to it, metal carbonates, sulfates, sulfites, silicates, or phosphates or a mixture thereof can be used as fillers. Typically, backlacks of this kind contain 74 to 85% by volume epoxy resin, 6 to 10% by volume hardener, and 5 to 20% by volume filler.

In the present context, an activator should be understood to be a substance that promotes the hardening reaction of the hardenable polymer adhesive layer, whether because the activator reduces the temperature at which the hardening occurs and/or because it accelerates the hardening reaction, for example the chemical cross-linking of the polymer adhesive layer. Suitable activators for epoxy resin systems include, for example, tertiary amines or imidazoles.

According to a preferred embodiment of the method according to the invention, the activator is an aqueous solution of an imidazole as the active component, in particular an aqueous solution of 2-ethyl-4-methyl imidazole. Surprisingly, it has been discovered that the applied mixture does not have to contain any thermoplastic or cross-linkable bonding agent, as proposed in WO 2014/089593 A1, in order to accelerate the bonding of the sheet metal parts during the hardening. In a particularly preferred embodiment, the liquid activator solution contains 2 to 10% by weight 2-ethyl-4-methyl imidazole, 80 to 90% by weight water, 0 to 15% by weight of an organic solvent such as 2-methoxypropanol, and 0 to 2% by weight of an additive such as Ligaphob N90 (Ligaphob N90 is a sodium soap of a technical oleic acid, manufactured by Peter Greven GmbH & Co. KG, Bad Münstereifel, Germany).

Particularly preferably, in the method according to the invention, a filler-containing bisphenol A epichlorohydrin resin system is used as the backlack and 2-ethyl-4-methyl imidazole is used as the activator.

An extremely wide variety of devices can be used as the strip accumulator in the method according to the invention. In the broadest sense of the term, strip accumulators include both continuous strip accumulators and discontinuous strip accumulators. The terms "continuous strip accumulator" and "discontinuous strip accumulator" here refer to the way in which the strip accumulator operates: A continuously operating strip accumulator continuously receives sheet metal strip while at the same time dispensing it cyclically. With continuous receiving and continuous dispensing, the strip speeds at the inlet and outlet of the strip accumulator differ for a certain period of time within the limitations of the strip accumulator capacity. The cyclical dispensing is thus a special instance of the continuous strip accumulator in which the strip on the outlet side of the strip accumulator can even be stopped while on the inlet side, it is still being fed continuously. By contrast, a discontinuously operating strip accumulator is a strip accumulator in which strip receiving and strip dispensing are separated at least chronologically, but if need be also physically, i.e. at least during the—preferably continuous—feeding of the strip into the strip accumulator, no strip is dispensed from the strip accumulator and during the cyclical dispensing of the strip, no strip is received into the strip accumulator.

A sheet metal strip, which—as described above—is coated with partially cross-linked backlack (B-stage), turns out to be storage stable enough that the production of the coated sheet metal strip can already take place in the steel plant. An application of an activator, however, cannot take place yet during the production of the sheet metal strip that is coated with the partially cross-linked backlack since the activator drastically reduces the storage stability of the backlack and even at low storage temperatures, leads to a gradual hardening of the backlack. Since the production of lamination stacks is usually both chronologically and physically separate from the production of the sheet metal strip itself, the sheet metal strips that are coated with partially cross-linked backlack are typically provided in coil form and the application of additives such as bonding agents and reaction accelerators only takes place, as described in WO 2014/089593 A1, just before the sheet metal strip is fed into a cutting device. It has now been surprisingly discovered that by applying a fluid that contains an activator and then drying the applied activator layer, the storage stability of the resulting sheet metal strip, which then has a layer of partially cross-linked backlack and a layer of dried activator, can be increased so much that it is possible to temporarily store the sheet metal strip. In one embodiment of the method according to the invention, therefore, a discontinuous strip accumulator is used, into which the sheet metal strip that is coated with the dried activator is initially introduced. At a later time, the sheet metal strip from the strip accumulator is fed to a cyclically operating cutting device. One example of a discontinuous strip accumulator is a reel on which the sheet metal strip that is coated with the dried activator is wound as a coil. The use of a discontinuous strip accumulator can even be advantageous if—depending on the type of backlacks and activators used—an incipient further reaction of the backlack before the feeding into the cutting device is actually desirable. For the required resting time after the application of the activator, the sheet metal strip can then be stored in space-saving coil form before the strip is fed to the cutting device at the desired time.

Particularly preferably, however, a continuous strip accumulator is used in the method according to the invention, i.e. a strip accumulator that the sheet metal strip travels all the way through and immediately after exiting from the strip accumulator, is fed to the cyclically operating cutting device. A typical continuous strip accumulator, for example, is a strip loop that is designed so that in the strip accumulator, the sheet metal strip travels, for example via suitable moving deflecting rollers, along a dynamically changeable path so that on the one hand, at the inlet of the strip accumulator, a continuous feeding of the sheet metal strip is enabled, but at the outlet of the strip accumulator, a cyclical further transport during the operating cycle of the cutting device is ensured.

Preferably, the fluid containing the activator is a liquid, for example a liquid in which the activator is dissolved in a liquid solvent such as water. In the context of the present method, therefore, the term "drying" is understood to be a process in which the solvent is removed from the applied fluid so that after the drying, only the activator and possibly other nonvolatile additives present in the fluid remain as a defined additive layer on the sheet metal strip coated with backlack. Such liquids are preferably applied to the strip surface by means of roller application or in the form of a liquid jet.

According to another embodiment, the fluid containing the activator is an aerosol that is produced in the application device, for example by the atomization of a liquid. In this case, the sheet metal strip is transported through the aerosol containing the activator so that aerosol droplets can accumulate on the surface of the sheet metal strip and form a thin layer. Here, too, a liquid as a carrier of the activator is usually present, which must be removed in the subsequent drying process after the aerosol droplets have accumulated on the sheet metal strip.

The interposition of a strip accumulator between the application of the fluid and the cutting of the sheet metal parts from the sheet metal strip in the cutting device also enables a high flexibility in the drying of the applied fluid since both the spatial and chronological distance between the fluid application and the feeding of the sheet metal strip into the cutting device are increased in comparison to the prior art. When a discontinuous strip accumulator is used, it is even possible to achieve a complete decoupling from the strip speed in the cutting device. Suitable drying variants include transporting the strip in ambient air, which in the case of thin layers of liquid can already be sufficient for drying. Alternatively, an airflow with a defined relative humidity, in particular with a lower humidity than in the ambient air, can be directed at the fluid-coated sheet metal strip. Another alternative form of drying is to supply hot air, in particular hot air with a low humidity. Optionally, with each of these drying methods, the strip itself can be heated in order to promote the evaporation of the solvent. Preferably, an inductive heating method is used for this. When supplying heat as part of the drying procedure of the activator, however, it is necessary to make sure that the temperature of the sheet metal strip remains within a range that lies below the hardening temperature of the backlack, i.e. of the pre-coated hardenable polymer adhesive layer.

If the drying of the applied fluid is accompanied by a heating of the sheet metal strip, then in another embodiment of the method according to the invention, it is also possible for the sheet metal strip to be cooled immediately after the drying of the applied fluid, for example by blowing ambient air or cooled ambient air over the sheet metal strip. The cooling of the sheet metal strip then preferably takes place before the sheet metal strip is fed into the strip accumulator.

The invention also relates to a device for connecting sheet metal parts to form a lamination stack in which between an application device for applying a fluid that contains an activator and a cyclically operating cutting device, a strip accumulator is provided. Thus the subject of the invention is also a device for connecting sheet metal parts to form lamination stacks, comprising a feeding device for continuously feeding a sheet metal strip whose top and/or bottom has a hardenable polymer adhesive layer, an application device for applying a fluid that contains an activator to the adhesive layer of the sheet metal strip, a drying device for drying the applied fluid, a cyclically operating cutting device for cutting sheet metal parts from the sheet metal strip, and a piling and stacking device for stacking the cut sheet metal parts and for connecting the sheet metal parts to form lamination stacks. The device according to the invention is characterized in that a strip accumulator is positioned between the application device and the cutting device.

According to one variant of the device according to the invention, the strip accumulator is a discontinuous strip accumulator and can, for example, be embodied to accommodate a coil of the sheet metal strip that is coated with backlack and dried activator. In this case, the device according to the invention includes two sub-devices that are independent of each other. The first sub-device includes the application device for continuously applying and drying the activator fluid and a first component of the discontinuous strip accumulator for the sheet metal strip that is coated with the dried activator. In this first component, which for example has a reel, the sheet metal strip that is coated with the dried activator is wound into a coil. This coil can be temporarily stored for a certain amount of time and can then be transported to the second sub-device for further processing. The second sub-device includes a second component of the discontinuous strip accumulator for the sheet metal strip that is coated with the dried activator, the cutting device, and the piling and stacking device. The strip that is coated with activator must therefore be transported from the first sub-device to the second sub-device. It is thus particularly suitable to store the strip in coil form. Since such a coil can be transported between the first and second sub-devices, the first and second sub-devices do not even necessarily have to be provided in the same location. It is even conceivable for the coating with the activator to be carried out in the first sub-device provided by one specialized manufacturer, while the cutting/adhesive stacking is performed in the second sub-device provided by another specialized manufacturer.

According to another variant of the device according to the invention, the strip accumulator is a continuous strip accumulator and can be embodied, for example, to produce a dynamically changeable strip loop of the sheet metal strip coated with backlack and dried activator.

The application device for the aqueous activator solution preferably includes a low-quantity lubrication device (also referred to as a minimal quantity lubrication device) with spray nozzles made of a corrosion-resistant material. It is therefore possible to use commercially available and thus inexpensive low-quantity lubrication systems. But since these commercially available systems are designed to dispense oil-containing fluids that do not place special demands on the materials used, they must be adapted for use in the method according to the invention at least with regard to the nozzles used insofar as nozzles made of a corrosion-resistant material are used, for example a corrosion-resistant and acid/base-resistant stainless steel material.

The invention also relates to a lamination stack comprising a plurality of stacked sheet metal parts between which an adhesive layer is embodied, which contains a cross-linked epoxy backlack, preferably based on a bisphenol A epichlorohydrin resin system and a derivative of an activator, wherein the activator contains an imidazole, preferably 2-ethyl-4-methyl imidazole. During hardening, the imidazole derivative is irreversibly bonded to the growing chains of cross-linked backlack and thus produces an effect as a cross-linking reagent, which manifests itself in very good properties such as a high glass transition temperature of the hardened network.

The adhesive layer between the individual sheet metal parts preferably has a thickness in the micrometer range, preferably in the range from 2 to 10 μm.

BRIEF DESCRIPTION OF THE DRAWINGS

The invention will be explained in greater detail below with reference to exemplary embodiments shown in the accompanying drawings.

In the drawings.

WAY TO IMPLEMENT THE INVENTION

Figure 1:
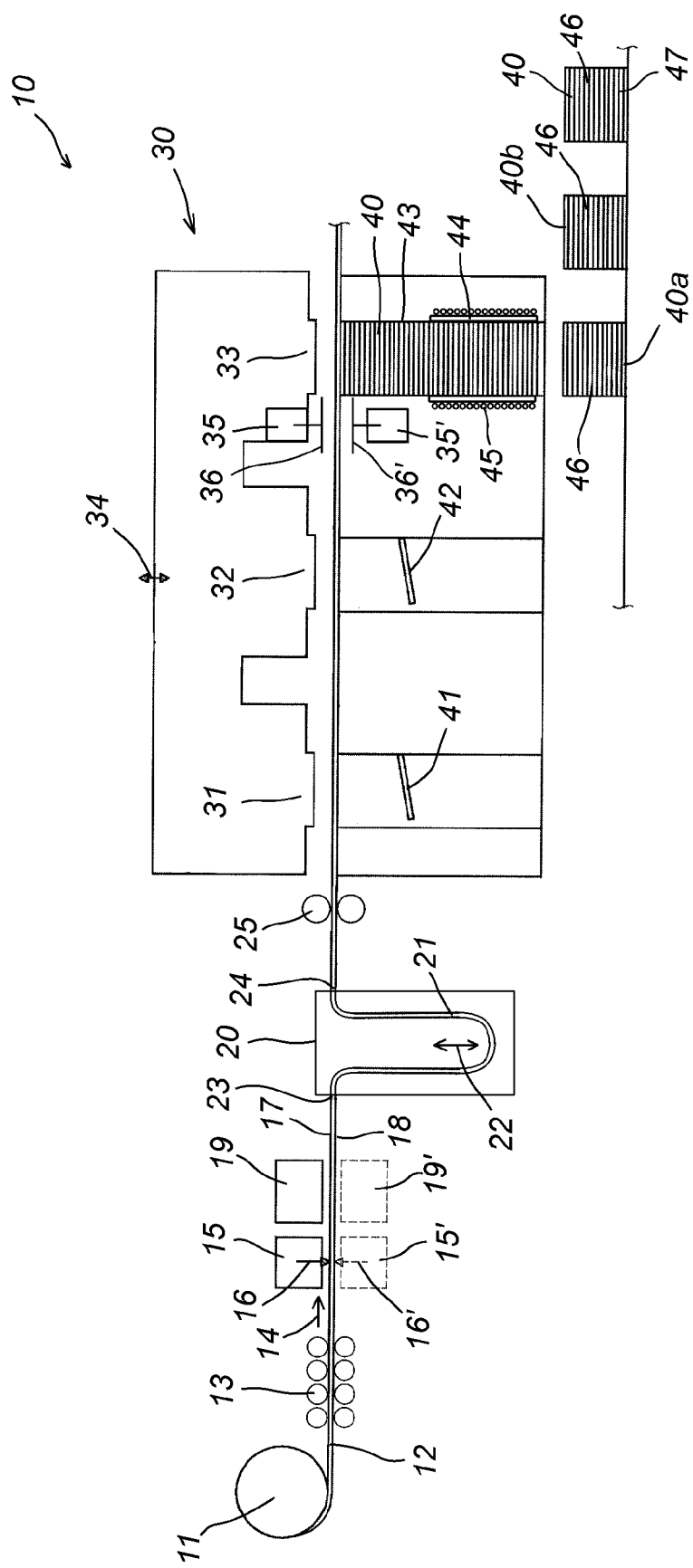
FIG. 1 shows a schematic view of a device for producing a lamination stack with a continuous strip accumulator.

FIG. 1 shows a device for carrying out the method according to the invention, labeled as a whole with the reference numeral 10, which is for continuously connecting sheet metal parts to form lamination stacks. In the device shown in FIG. 1, a continuous strip accumulator is used. The starting material for the method according to the invention is a sheet metal strip that is coated with backlack, i.e. with a hardenable polymer adhesive layer, and that in the example shown is provided in the form of a roll, which is also referred to as a coil 11. After being unwound from the coil 11, the backlack-coated sheet metal strip 12 usually travels through a strip transporting device and a straightening device 13, which transports the strip in the direction of the arrow 14 and after the passage through the straightening device, ensures a flat, distortion-free condition of the unwound strip. After passing through the straightening device 13, the sheet metal strip 12 is transported continuously through an application device 15 in which a fluid 16 that contains an activator is applied to the polymer adhesive layer that is already present on the top and/or bottom 17, 18 of the strip 12. If the strip 12 is coated with backlack on both the top 17 and the bottom 18, then a corresponding application device 15' is provided to apply the activator fluid 16' on the underside of the strip 12 as well, as shown with dashed lines in FIG. 1. The application device 15, 15' includes a low-quantity lubrication device with spray nozzles made of a corrosion-resistant and acid/base-resistant stainless steel material. The application device 15, 15' is followed immediately by a drying device 19, 19' in which the applied fluid is dried. The drying device 19, 19' can for example have a blower for dry air or hot air and/or heating units such as induction heating units for heating the sheet metal strip 12 in order to promote the drying of the applied fluid layer. The heating of the sheet metal strip 12 in this case is regulated so that a hardening of the pre-coated backlack is avoided, i.e. the temperature of the sheet metal strip and the backlack layer is always kept below the hardening temperature of the backlack. The drying device 19, 19' can also be followed by a cooling device (not shown in the embodiment in FIG. 1), which uses a blower for example to cool the heated strip back down to the ambient temperature as quickly as possible. Such a cooling device, however, is not absolutely required and could be taken into consideration primarily when the heating of the sheet metal strip for the drying of the activator fluid is carried out at higher temperatures that are close to the hardening temperature of the backlack. After the drying of the applied activator fluid and a possibly provided cooling, the sheet metal strip 12 is fed into a strip accumulator 20, which in the example shown in FIG. 1 is embodied as a continuous strip accumulator. In the example shown, the continuous strip accumulator 20 is symbolized by a looping path 21 through which the sheet metal strip 12 passes. The additional path through which the strip 12 passes in the strip accumulator 20 can be dynamically changed, for example by means of moving deflecting rollers, which are symbolized by the arrow 22 in FIG. 1. Because of the dynamically changeable path of the strip loop 21, the sheet metal strip 12 can be continuously fed to the inlet 23 of the strip accumulator 20, but can be transported further in cyclical fashion at the outlet 24 of the strip accumulator 20. For this purpose, the strip accumulator 20 is followed by a feed device 25, which transports the strip 12 further into a cutting device that is labeled as a whole with the reference numeral 30.

In the example shown, the cutting device 30 is a stamping device, in which one or more stamping tools 31, 32, 33 stamp sheet metal parts 40 from the sheet metal strip 12. If, as shown, several stamping tools 31, 32, 33 are provided, then the individual stamping tools can either stamp simple sheet metal parts 40 in parallel or produce more complex sheet metal parts in a plurality of stamping steps. In the example shown, the first and second stamps 31, 32 can cut sheet metal parts 41, 42 from the sheet metal strip 12, which are rejected as lost parts and are no longer needed for the remainder of the production process of the lamination stack.

As symbolized by the arrow 34, the upper tools of the stamping tools 31, 32, 33 are moved up and down in cyclical fashion as the sheet metal strip is transported further through the strip-feeding device 25 in the same cycle.

The stamped sheet metal parts 40 are stacked onto one another in the form of a column in a guide 43. The heatable inner wall of the guide 43 has a profile that tapers slightly in conical fashion toward the bottom so that the guide 43 exerts a resistance like a stack brake on the stacked sheet metal parts 40. A wall section 44 of the guide 43 is heated by a heating unit 45 so that the sheet metal parts 40 are heated to a temperature above the hardening temperature of the backlack and as a result, a joining of the sheet metal parts 40 by means of heat and pressure takes place. For this purpose, the guide 43 is surrounded by a heating unit 45, which heats the sheet metal parts in the guide 43 to a temperature above the cross-linking temperature of the applied backlack and thus ensures a connection of the individual sheet metal parts 40 by means of the hardened backlack layer 47 between successive sheet metal parts 40 to form lamination stacks 46.

Figure 2:
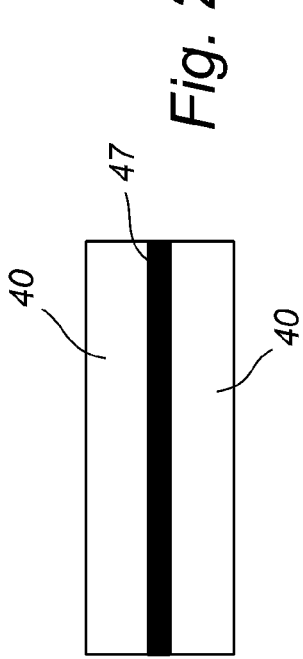
FIG. 2 shows a schematic depiction of the adhesive layer provided between two sheet metal parts in a lamination stack.

FIG. 2 shows an enlarged schematic detail from the lamination stack 46 with two successive sheet metal parts 40 and a hardened backlack layer 47 between them.

Preferably, the sheet metal strip 12 is coated with backlack on both the top 17 and the bottom 18 so that when the sheet metal parts 40 are connected, an adhesive bond between the backlack layers of stacked sheet metal parts 40 is assured. Depending on the adhesive properties of the backlack on the sheet metal part itself, it is possible to achieve a sufficiently firm connection of sheet metal parts to form a stack, even with sheet metal parts that are coated on only one side.

If a number of sheet metal parts has been stamped that corresponds to the desired height of the lamination stacks 46 being produced, then suitable measures are taken to make sure that the next sheet metal part stamped (for example the sheet metal part 40a in FIG. 1) no longer adheres to the last (top) sheet metal part (for example the sheet metal part 40b in FIG. 1) and thus even after the hardening of the backlack, the sheet metal parts from the column of sheet metal parts that has been formed in the guide 43 can be easily separated into individual stacks 46 with the desired number of sheet metal parts. To achieve this, the person skilled in the art has a wide variety of measures available which are described extensively by the present applicant. As is described, for example, in EP 2 883 692 A1 or EP 30 89 335 A1, at the locations in the strip at which sheet metal parts are stamped, which are not intended to produce any adhesion effect with the subsequent sheet metal part, they can be coated on the top and/or bottom with corresponding separating means such as separating foils or separating tabs. It is also possible, for example, for structured separating elements to be interposed at a suitable point, which, due to their small contact area with the sheet metal parts do not produce a powerful adhesion effect and thus can be easily removed again after the separation into individual stacks. It is also possible for the sheet metal parts to be embossed with nubs, which function as spacers relative to the preceding sheet metal part and thus enable an easier separation of the individual stacks. In FIG. 1, the placement or insertion of suitable separating means is symbolized by means of the separating means applicator 35, 35', which in the example shown applies a separating tab 36, 36' at the desired location to the top and/or bottom of the strip. When a stamped sheet metal part that is to be stamped out has a separating tab on the top and bottom, for example, the corresponding sheet metal part functions as a sacrificial lamination and is not part of a stack. If the sheet metal part (for example sheet metal part 40a) has a separating tab on the bottom, and the preceding sheet metal part (for example 40b) has a separating tab on the top, then the sheet metal parts remain components of the respective different stacks 46.

Figure 3:
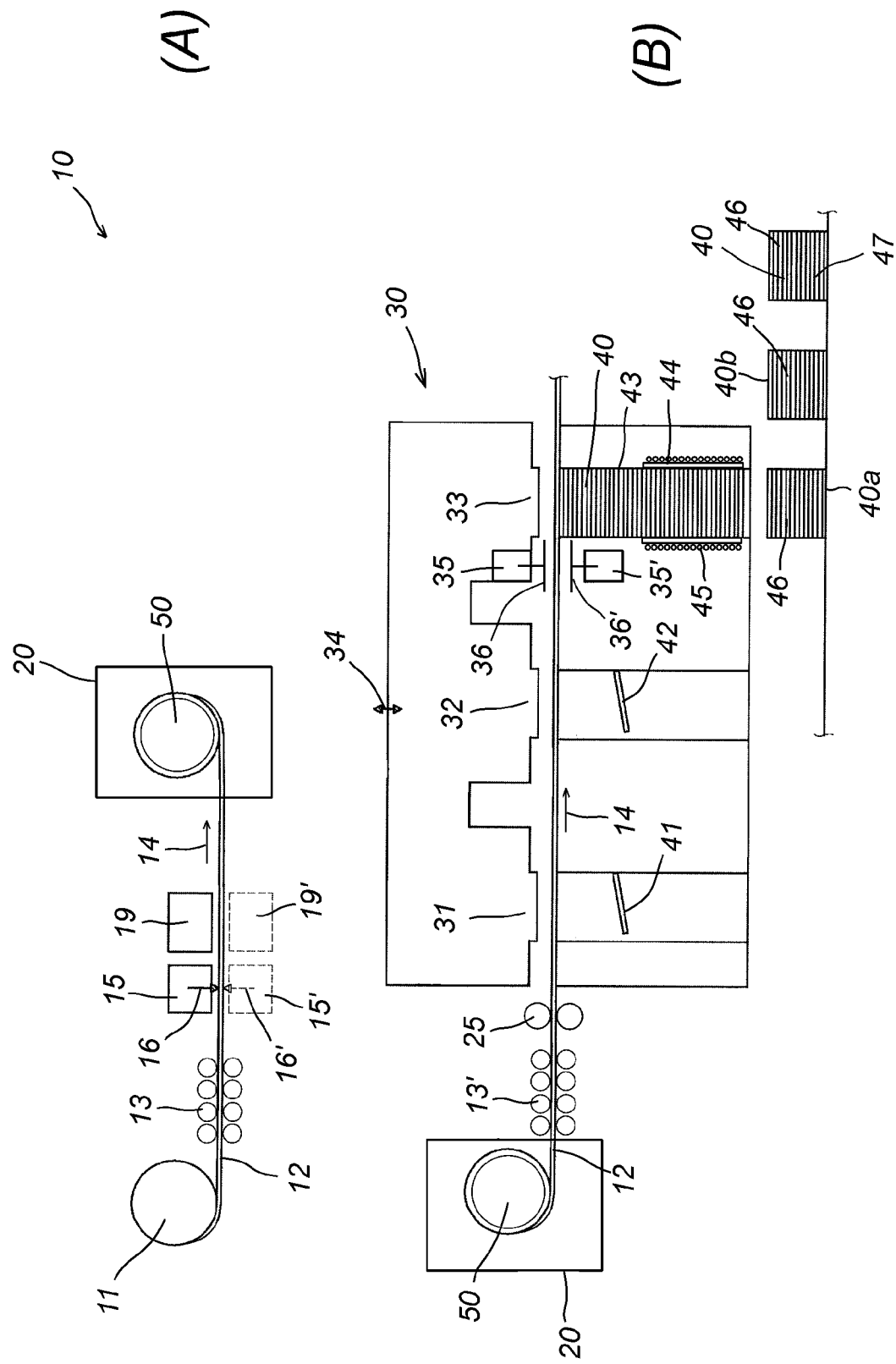
FIG. 3 shows a variant of the device from FIG. 1 with a discontinuous strip accumulator.

FIG. 3 shows a variant of the device from FIG. 1, which differs from the variant in FIG. 1 in that the application of the activator fluid occurs in a separate preparation step (FIG. 3A), whereas the stamping of the sheet metal parts occurs in a chronologically independent subsequent step (FIG. 3B). In FIG. 3, elements, which are identical to corresponding elements in the exemplary embodiment in FIG. 1 or which fulfill a similar function, have been labeled with the same reference numerals.

In the embodiment in FIG. 3, the first step according to FIG. 3A begins like it does in the embodiment of the method according to FIG. 1, with the unwinding of the sheet metal strip 12 from the coil 11 and subsequent straightening in the straightening device 13. Here, too, this is followed by the coating with activator fluid in the application device 15 and the subsequent drying of the applied activator layer in the drying device 19. As in the method in FIG. 1, the strip is then conveyed in the transport direction symbolized by the arrow 14 into a strip accumulator 20. By contrast with the embodiment in FIG. 1, the strip accumulator 20 of the embodiment in FIG. 3 is a discontinuous strip accumulator, which is symbolized in FIG. 3 by a coil 50, i.e. the sheet metal strip 12, which is pre-coated with backlack and is now also coated with a dried activator layer, is wound on a reel to produce the coil 50. The coil 50 can then be temporarily stored.

After a storage time that is typically far less than the storage time for a hardening of the backlack, the coil 50 is then fed to the cutting device 30 in a separate step according to FIG. 3B. After the unwinding of the coil 50 and possible straightening of the strip by means of a straightening device 13', the further processing is carried out in the cutting device by means of the cyclically operating feed device 25 in exactly the same way as described above in connection with the embodiment in FIG. 1.

It is clear that even in the variant in FIG. 3, the unwinding of the strip 12, which is pre-coated with backlack, from the original coil 11, the subsequent coating, drying, and possible cooling of the applied activator, as well as the winding onto the coil 50 serving as a discontinuous strip accumulator take place in a continuous process, whereas the further processing of the sheet metal strip 12 coated with the activator takes place after the unwinding of the coil 50 in a manner that is adapted to the cyclical operation of the cutting device. Here, too, the strip accumulator 20, now in the form of a discontinuous strip accumulator, ensures a separation of the continuous and cyclical method steps.

The invention claimed is:

1. A device for connecting sheet metal parts to form lamination stacks, wherein the device comprises:
   a feeding device for continuously feeding a sheet metal strip having a hardenable polymer adhesive layer on one or both of top and bottom surfaces of the sheet metal strip,
   an application device for applying a fluid that contains an activator to the adhesive layer of the sheet metal strip,
   a drying device for drying the applied fluid, wherein the drying device includes a blower that supplies air and a heating unit that heats the sheet metal strip during the drying, wherein heating is regulated to keep a temperature of the sheet metal strip and of the hardenable polymer adhesive layer always below a hardening temperature of the hardenable polymer adhesive layer,
   a cyclically operating cutting device that includes at least one stamping tool for cutting sheet metal parts from the sheet metal strip,
   a piling and stacking device for stacking the cut sheet metal parts and for connecting the sheet metal parts to form lamination stacks, and
   a strip accumulator positioned between the application device and the cutting device.

2. A method for connecting sheet metal parts to form lamination stacks using the device according to claim 1, comprising:
   continuously transporting a sheet metal strip having a hardenable polymer adhesive layer on a top and/or bottom surface of the sheet metal strip through an application device in which a fluid that contains an activator is applied to the adhesive layer;
   drying the applied fluid;
   continuously feeding the sheet metal strip that is coated with the dried activator to a strip accumulator;
   feeding the sheet metal strip from the strip accumulator to a cyclically operating cutting device in which sheet metal parts are cut from the sheet metal strip and stacked on one another; and
   connecting the cut and stacked sheet metal parts to one another with the adhesive layers that are coated with the activator to form lamination stacks.

3. The method according to claim 2, wherein the hardenable polymer adhesive layer contains a pre-cross-linked epoxy backlack that is applied in a different layer thickness on the top and the bottom surfaces of the sheet metal strip.

4. The method according to claim 3, wherein the epoxy backlack is pre-cross-linked to a different degree on the top and the bottom surfaces of the sheet metal strip.

5. The method according to claim 2, wherein the strip accumulator is a discontinuous strip accumulator.

6. The method according to claim 2, wherein the strip accumulator is a continuous strip accumulator.

7. The method according to claim 2, wherein the fluid containing the activator is applied in a liquid form.

8. The method according to claim 7, wherein the fluid containing the activator is applied onto the sheet metal strip in the form of a liquid jet or by using rollers.

9. The method according to claim 2, wherein the fluid containing the activator is applied as an aerosol.

10. The method according to claim 9, wherein the sheet metal strip is transported through the aerosol containing the activator.

11. The method according to claim 2, wherein the fluid applied to the sheet metal strip is dried by supplying air.

12. The method according to claim 11, wherein the sheet metal strip is heated during the drying.

13. The method according to claim 11, wherein the sheet metal strip is cooled after the drying.

14. The device according to claim 1, wherein the strip accumulator accommodates a coil of the sheet metal strip that is coated with the hardenable polymer adhesive layer and dried activator.

15. The device according to claim 1, wherein the strip accumulator produces a dynamically changeable strip loop of the sheet metal strip coated with the hardenable polymer adhesive layer and dried activator.

16. The device according to claim 1, wherein the application device includes a low-quantity lubrication device with spray nozzles made of a corrosion-resistant material.

17. The device according to claim 1, wherein the strip accumulator is a discontinuous strip accumulator or a continuous strip accumulator.

18. The device according to claim 1, wherein the application device includes rollers for applying the fluid containing the activator onto the sheet metal strip.

\* \* \* \* \*